3,111,517
DERIVATIVES OF 3,4-DIHYDROBENZO-
THIADIAZINE DIOXIDES
William M. McLamore, Kew Gardens, N.Y., and Gerald
D. Laubach, Niantic, Conn., assignors to Chas.
Pfizer & Co., Inc., New York, N.Y., a corporation of
Delaware
No Drawing. Filed Sept. 8, 1959, Ser. No. 838,422
14 Claims. (Cl. 260—243)

This invention is concerned with a new class of highly effective therapeutic agents as well as the method of preparing same. In particular, the therapeutic agents of this invention are 3,6-disubstituted-7-sulfamyl-3,4-dihydrobenzo-1,1-dioxo-1-thia-2,4-diazines. The compounds, hereinafter referred to as 3,6-disubstituted-7-sulfamyl-3,4-dihydrobenzothiadiazine dioxides, are represented by the following formula:

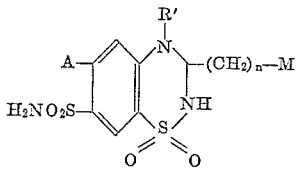

wherein A is selected from the group consisting of hydrogen, Cl, F, Br, $NO_2$, $NH_2$, trifluoromethyl and alkyl and alkoxy each containing 1 to 3 carbon atoms and R' is selected from the group consisting of hydrogen and alkyl containing 1 to 3 carbon atoms; $n$ is an integer from 1 to 3; and M is selected from the group consisting of halogen (Cl, Br, F, I) and R—Y, in which Y is selected from the group consisting of S, SO and $SO_2$ and R is selected from the group consisting of alkyl and alkenyl containing up to 12 carbon atoms; cycloalkyl containing 4 to 6 carbon atoms; naphthyl;

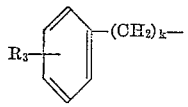

wherein $k$ is an integer from 0 to 4 and $R_3$ is selected from the group consisting of hydrogen, amino, lower alkylamino, nitro, fluoro, chloro, bromo, lower alkyl and loweralkoxy; $Z$—$(CH_2)_q$— wherein $q$ is an integer from 0 to 3 and Z is selected from the group consisting of thienyl, thiazolyl, pyrimidyl, pyridyl, furyl, imidazolyl and benzimidazolyl;

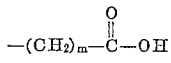

wherein $m$ is an integer from 1 to 5;

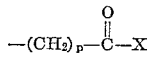

wherein $p$ is an integer from 0 to 5 and X is selected from the group consisting of —$NH_2$, —$NHR_1$, —$NHNH_2$, $NHNHR_1$, and $OR_1$ wherein $R_1$ is selected from the group consisting of lower alkyl, phenyl and aralkyl containing 7 to 10 carbon atoms; and

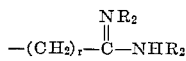

wherein $r$ is an integer from 0 to 5 and $R_2$ is selected from the group consisting of hydrogen, lower alkyl, phenyl and aralkyl containing 7 to 10 carbon atoms.

Although in the above formula reference is made to a preferred carbon content of the described alkylene and hydrocarbon substituents, 3,6-disubstituted-7-sulfamyl-3,4-dihydrobenzothiadiazine dioxides containing similar groups with higher carbon content may be employed. For example, the alkylene chain represented by $(CH_2)_n$ may be of higher carbon content than indicated and may also be substituted with various groups, for example, lower alkyl, phenyl, aralkyl and alkaryl, which in turn, may be substituted by such groups as halogen, nitro, alkoxy, amino and the like. However, the therapeutic activity of such compounds may tend to decrease. Further, since 3,6 - disubstituted-7-sulfamyl-3,4-dihydrobenzothiadiazine dioxides containing alkylene and hydrocarbon substituents of higher carbon content provide no appreciable advantage and the starting compounds for the production of said compounds are generally less economically advisable, they are not preferred. Oxygen analogs of the present new compounds, that is compounds in which Y is oxygen, also possess the valuable therapeutic effectiveness herein described.

It is also intended to include within the scope of this invention the base addition salts of the above class of compounds as well as the acid addition salts of those compounds in which R contains a basic nitrogen, such as those in which R contains an amino group or a nitrogen heterocyclic ring. Particularly valuable are salts of acids containing a pharmacologically acceptable anion and bases containing a pharmacologically acceptable cation.

Particularly valuable as therapeutic agents are those 3,6-disubstituted-7-sulfamyl-3,4-dihydrobenzothiadiazine dioxides in which A is chloro, methyl or trifluoromethyl. Those compounds in which M is halogen are effective diuretic agents and also are useful for the preparation of those in which M is R—Y as hereinafter described.

It has been found that the 3,6-disubstituted-7-sulfamyl-3,4-dihydrobenzothiadiazine dioxides of this invention may be prepared by the reaction of a substituted aniline of the formula:

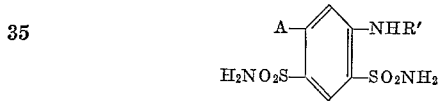

in which A and R' are as described above, with an aldehyde of the formula:

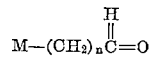

in which M and $n$ are as previously described. For example, those compounds in which M is halogen may be prepared with

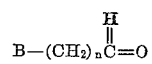

in which B is halogen (F, Cl, Br, I); those in which M is R—Y—, with

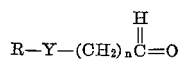

Alternatively, corresponding aldehyde derivatives may be employed in place of the aldehyde, for example, lower-alkyl acetals of these aldehydes, which may be generally represented by the formula M—$(CH_2)_n$—$CH(OR_7)_2$ in which $R_7$ is lower alkyl. The reaction is preferably effected by heating a substantially equimolar mixture of the reactants in an inert organic solvent at a temperature of from about 60° C. to about 120° C. Usually, a reaction time of from about ½ to about 5 hours is found to give excellent yields of the desired products. Longer reaction time may be used without appreciable advantage. Slight excess of aldehyde, or derivative, for example up to 10% may be used, but larger excesses should be avoided since their use may lead to reduced yield of the desired product.

By inert organic solvents as employed herein is meant an organic solvent which dissolves the reactants but does not react with same under the reaction conditions described. Such solvents may be readily determined by routine experimentation in the laboratory. Although other solvents may be employed, excellent results are obtained with N,N-dialkylloweralkanoamides, such as dimethylformamide, diethylacetamide, dipropylpropionamide, diethylformamide and the like, as well as alkylated glycols, such as the dimethyl ether of ethylene glycol, the methyl ether of propylene glycol, the diethyl ether of butylene glycol, the dipropyl ether of ethyleneglycol and the like. When the acetals are used in place of the aldehydes, it is generally found helpful, but not essential, to add a minor amount of aqueous mineral acid. Usually only a few drops of aqueous acid, such as hydrochloric, sulfuric, phosphoric and the like, is found sufficient. The addition of acid merely increases the rate of reaction.

After the reaction is complete, the products are obtained by conventional methods, such as concentration and crystallization. The products may then be recrystallized from suitable solvents.

The valuable therapeutic agents of this invention in which Y is S may also be prepared from 3-(haloalkyl)dihydrobenzothiadiazine dioxides of the following formula:

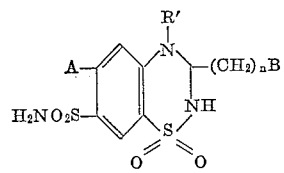

in which A, R' and $n$ are as above described and B is halogen (F, Cl, Br, I), by reaction with a suitable thiol, RSH, in which R is as previously described. This reaction is generally carried out by contacting the above described 3 - (haloalkyl)dihydrobenzothiadiazine dioxides with the selected thiol in the presence of an inorganic base, preferably alkali or alkaline earth metal hydroxides, oxides, carbonates and bicarbonates, ammonium hydroxide and their obvious equivalents. Organic bases, such as sterically-hindered tertiary amines may also be employed. Preferred are mono-, di- and trisubstituted pyridines, represented by the formula:

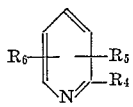

wherein $R_4$ is selected from the group consisting of chloro, bromo and alkyl containing 1 to 3 carbon atoms and $R_5$ and $R_6$ are each selected from the group consisting of hydrogen, chloro, bromo and alkyl containing 1 to 3 carbon atoms. These are preferred since best results are obtained when they are used. Other sterically-hindered tertiary amines may also be employed in this process.

The inorganic base, preferably the metal hydroxide, is best utilized in the form of an aqueous solution generally containing from about 5% to about 20% by weight of hydroxide although from 5% to 15% is preferred since best yields are obtained. Alternatively, solutions of the inorganic base in lower alkanols, e.g. methanol and ethanol, may be used. While the reaction proceeds satisfactorily in aqueous solution, the addition of an organic solvent materially facilitates production of desired compounds by providing a more intimate contact of the reactants which have a limited solubility in water. Organic solvents useful in this respect are ketones such as acetone and ethyl methyl ketone, lower alkanols such as methanol, ethanol and the propanols, and preferably dimethylformamide and similar lower-alkylated formamides.

Although an equimolar ratio of reactants is found to yield appreciable amounts of product, it is generally preferred to employ excess thiol to obtain best yields. Excess of up to about 40 mole percent are found particularly suitable, while larger excesses, although operable, provide no appreciable advantage.

The reaction may be advantageously carried out at temperatures of from 20° to 120° C. for from about 1 to about 12 hours. Heating at higher temperatures and for longer periods of time may lead to reduced yield of the desired product.

After the reaction is complete, the product may be obtained by conventional methods. For example, the product precipitates from the reaction mixture on cooling, is separated and purified by recrystallizing from appropriate solvents, such as acetone, lower alkanols, acetone-ether mixtures, acetone-alkanol mixtures and the like.

The compounds in which Y is SO or $SO_2$ may also be prepared by the reaction of those compounds in which Y is S with a suitable oxidizing agent. A preferred oxidizing agent is hydrogen peroxide in aqueous solution generally employed at concentrations of from about 30% to 40% by weight although higher or lower percentages of hydrogen peroxide are operable. Alkali metal permanganates may also be employed as oxidizing agents but their use may lead to lower yields of the desired product. The reaction may be conveniently carried out in a solvent such as lower alkanoic acids for example, acetic acid. Other water miscible solvents may be advantageously employed in this oxidation process for example, lower alkanols such as ethanol, methanol, propanol or ketones such as acetone or ethyl methyl ketone. These compounds are prepared employing at least stoichiometric amounts of hydrogen peroxide. Because of its tendency to decompose, it is found advisable to employ excess hydrogen peroxide. Of course, as is known to those skilled in the art, extremely large excesses of the oxidizing agent should be avoided in preparing the present compounds in which Y is SO to minimize the coproduction of those in which Y is $SO_2$. A particularly convenient method of preparation of the former is to react the substrate with about a 100% excess of hydrogen peroxide at room temperature (20–30° C.) although lower temperatures may be employed for example, temperatures as low as 0° C. The use of higher temperatures may appreciably reduce the yield of the desired product and hence are preferably avoided. The preparation of those compounds in which Y is SO may be conveniently carried out by employing a large excess of peroxide, say from 200% to 400% excess and even higher. Heating the reaction mixture is particularly helpful since it materially shortens the reaction time and ensures complete conversion. As is obvious, these latter compounds may also be prepared from those in which Y is SO, which constitute an intermediate stage of oxidation. After the reaction is complete, the product is obtained by conventional procedures for example, concentration and precipitation.

The therapeutic agents of this invention in which R is other than $(CH_2)_mCOOH$ or $(CH_2)_pCOX$, as hereindescribed, are effective diuretic agents. Those compounds in which R is $(CH_2)_pCOX$, wherein $p$ is as described above and X is $—NH_2$, $—NHR_1$, $—NHNH_2$ or $—NHNHR_1$ are effective hypotensive agents. Of course, hypotensive agents are used for the lowering of blood pressure in humans. The present agents may be used alone or in combination with other therapeutic agents according to standard medical practice. The compounds in which R is $(CH_2)_mCOOH$ or $(CH_2)_pCOOR_1$ are intermediates for the preparation of the present hypotensive agents.

The ideal diuretic agent should principally have an enhancing effect on salt as well as water excretion. Additionally, it should maintain a sustained electrolyte balance of body fluids, for example, maintain normal pH values, normal potassium and bicarbonate levels and effect an equivalent excretion of sodium and chloride ions on a sustained basis. Further, a diuretic agent should have a continued effectiveness during daily administration for protracted periods of time. Many diuretics of the prior art are limited in therapeutic application since they do not possess all of the above described properties. Some cause metabolic acidosis by increasing urinary pH; others cause increased potassium and bicarbonate ion elimination and no increase in chloride elimination. Many diuretics are not readily tolerated in prolonged therapy. Some diuretics initially possess many of these properties but in prolonged application either rapidly lose their desired effects or demonstrate a lack of continuous effective action particularly in salt elimination. Because the use of these diuretics in therapy results in a number of undesirable effects, they have only limited application since they may be used under only seriously restricted conditions. Certain diuretics are used in combination with other diuretics so that the combination possesses an appreciable number of the above described properties.

The therapeutic agents of the present invention which have diuretic activity possess a number of the properties of an ideal diuretic which makes them valuable compounds for therapeutic application.

The therapeutic agents of this invention may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramucularly, intravenously or subcutaneously. For parenteral administration they may be used in the form of a sterile solution containing other solutes—for example, enough saline or glucose to make the solution isotonic.

The physician will determine the dosage of the present therapeutic agents which will be most suitable and it will vary with the form of administration and the particular compound chosen, and furthermore, it will vary with the particular patient under treatment. He will generally wish to initiate treatment with small dosages substantially less than the optimum dose of the compound and increase the dosage by small increments until the optimum effect under the circumstances is reached. It will generally be found that when the composition is administered orally, larger quantities of the active agent will be required to produce the same effect as a smaller quantity given parenterally. The compounds are useful in the same manner as other diuretics and the dosage level is of the same order of magnitude as is generally employed with these other therapeutic agents. The therapeutic dosage will generally be from 100 to 500 milligrams per day although it may be administered in several different dosage units. Tablets containing from 25 to 250 mg. of active agent are particularly useful.

In the foregoing, reference is made to pharmacologically acceptable anions and cations. Examples of pharmacologically acceptable anion are iodide, chloride, bromide, sulfate, methylsulfate, acetate, propionate, tartrate, citrate, gluconate, and so forth. The term "pharmacologically acceptable anion" has a definite meaning to one skilled in the art. It is defined as non-toxic anion of any of the simple acids commonly used in pharmacology to neutralize basic medicinal agents when the salt thereof is to be used therapeutically. The pharmacological activity of the molecule is primarily a function of the cation, the anion serving chiefly to supply electrical neutrality. "Pharmacologically acceptable cations" also has a definite meaning to one skilled in the art. It is defined as a non-toxic cation of basic compounds commonly used in pharmacology to neutralize acid medicinal agents when the salt thereof is to be used therapeutically. The pharmacological activity of the molecule is primarily a function of the anion, the cation serving chiefly to supply electrical neutrality. Commonly employed pharmacologically acceptable cations are, for example, sodium, potassium, calcium, and magnesium. These acid and base addition salts of the compounds of the present invention may be prepared employing conventional procedures. One such procedure involves treating the subject compounds with an aqueous solution containing an equivalent amount of the reagents, i.e. the pharmacologically acceptable base, followed by concentration of the resultant mixture to obtain the desired product. Pharmacologically acceptable bases are those which contain the cations described above. Such bases may be for example, oxides, hydroxides, carbonates or bicarbonates. Of course, salts formed with pharmacologically unacceptable acids or bases, while not useful therapeutically, may be used in the purification of the present therapeutic agents and also in the preparation of the pharmacologically acceptable salts.

The above described 5-substituted-2,4-disulfamyl anilines may be prepared by procedures described in the literature, for example, the general procedure described in Monatsch. Chem., vol. 48, p. 87 (1927), which involves the treatment of a meta-substituted aniline with from 10 to 20 parts by weight of chlorosulfonic acid followed by the gradual addition of from about 90 to 170 parts by weight of sodium chloride. The resultant mixture is heated at approximately 150° C. for about 2 hours after which the reaction mixture is poured into water and the resultant 5-substituted aniline-2,4-disulfonyl chloride is filtered and is then treated with concentrated ammonium hydroxide by standard procedures to obtain the corresponding disulfonamide. The meta-substituted anilines, for example, meta-chloro, meta-fluoro, meta-bromo, meta-nitro, meta-alkanoyl, meta-alkyl, meta-trifluoromethyl and meta-alkoxy anilines, may be readily obtained or prepared by standard procedures known to one skilled in the art. The various aldehydes employed in the present process are readily available or preparable by one skilled in the art.

The following examples are given by way of illustration and are not to be construed as limitations of this invention many variations of which are possible without departing from the scope and spirit thereof.

EXAMPLE I

*3-Chloromethyl-6-Chloro-7-Sulfamyl-3,4-Dihydro-Benzothiadizine-1,1-Dioxide*

To 8 ml. of 40–50% chloroacetaldehyde aqueous solution and 7 ml. of dimethylformamide are added 10 g. of 2,4-disulfamyl-5-chloroaniline. The mixture is heated on a stream bath for 2 hours after which it is concentrated at reduced pressure. The residue is triturated with water.

The solid material is recrystallized from methanol-ether after treatment with activated carbon to give 7.2 g. of product, M. 229–230° C. (d). Elemental analysis gives the following results:

Calculated for $C_8H_9C_4N_3S_2Cl_2$: C, 27.75; H, 2.62. Found: C, 28.13; H, 3.01.

EXAMPLE II

*3-Chloromethyl-6-Chloro-7-Sulfamyl-3,4-Dihydro-Benzothiadiazine-1,1-Dioxide*

Three drops of 6 N HCl is added to a mixture of 2.85 g. of 2,4-disulfamyl-5-chloroaniline and 1.60 g. of chloroacetaldehyde diethylacetal in 4 ml. of dimethylformamide. The mixture is heated on a steam bath for 3 hours and the reaction mixture poured into water. The gum gradually crystallized to a solid which, after recrystallization from methanol-ether, gives 2.6 g. of product. Infrared spectrum of this product shows it to be identical with that of Example I.

EXAMPLE III

The procedure of Examples I and II are repeated to prepare various 3-(haloalkyl)-7-sulfamyl-3,4-dihydrobenzothiadiazine-1,1-dioxides which are listed in Table 1 together with the reacting aldehyde (or acetal).

TABLE 1

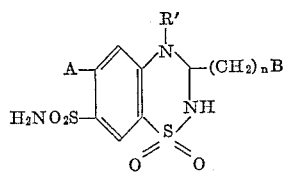

| A | n | B | R' | aldehyde or acetal |
|---|---|---|----|--------------------|
| Br | 1 | Br | H | BrCH₂CH(OCH₃)₂ |
| CF₃ | 1 | Br | H | BrCH₂CH(OCH₃)₂ |
| F | 2 | Cl | H | Cl(CH₂)₂CHO |
| OCH₃ | 2 | Cl | H | Cl(CH₂)₂CHO |
| CF₃ | 1 | F | H | FCH₂CHO |
| CH₃ | 1 | F | H | FCH₂CHO |
| CH₃ | 3 | Cl | H | Cl(CH₂)₃CH(OC₃H₂)₂ |
| F | 3 | Cl | H | Cl(CH₂)₃CH(OC₃H₂)₂ |
| Cl | 3 | Cl | CH₃ | Cl(CH₂)₃CHO |
| C₂H₅ | 3 | Cl | CH₃ | Cl(CH₂)₃CHO |
| CH₃ | 3 | Br | C₂H₅ | Br(CH₂)₃CHO |
| Br | 3 | Br | C₂H₅ | Br(CH₂)₃CHO |
| i-C₃H₇ | 2 | Cl | H | Cl(CH₂)₂CHO |
| NO₂ | 2 | Cl | H | Cl(CH₂)₂CHO |
| OC₃H₇ | 1 | Cl | H | ClCH₂CH(OC₂H₅)₂ |
| H | 1 | Cl | H | ClCH₂CH(OC₂H₅)₂ |
| NO₂ | 2 | F | i-C₃H₇ | F(CH₂)₂CH(OCH₃)₂ |
| OC₃H₇ | 2 | F | i-C₃H₇ | F(CH₂)₂CH(OCH₃)₂ |
| CF₃ | 2 | F | n-C₃H₇ | F(CH₂)₂CHO |
| CF₃ | 2 | F | n-C₃H₇ | F(CH₂)₂CHO |
| NH₂ | 1 | I | CH₃ | ICH₂CHO |
| C₃H₇ | 1 | I | CH₃ | ICH₂CHO |
| H | 1 | Br | H | BrCH₂CH(OCH₃)₂ |
| C₂H₅ | 1 | Br | H | BrCH₂CH(OCH₃)₂ |
| H | 1 | I | H | ICH₂CHO |
| Cl | 1 | I | H | ICH₂CHO |
| OCH₃ | 2 | Cl | H | Cl(CH₂)₂CHO |
| Cl | 1 | Br | H | BrCH₂CHO |
| Cl | 1 | Br | H | BrCH₂CH(OC₂H₅)₂ |

EXAMPLE IV

*3-Benzylthiomethyl-6-Chloro-7-Sulfamyl-3,4-Dihydrobenzothiadiazine-1,1-Dioxide*

A mixture of 3-(chloromethyl)-6-chloro-7-sulfamyl-3,4-dihydrobenzothiadiazine-1,1-dioxide (0.02 mole) and benzylmercaptan (0.024 mole) in 20 ml. of 10% sodium hydroxide and 20 ml. of dimethylformamide is stirred at room temperature for 6 hours. After heating for 10 minutes on a steam bath, the mixture is cooled and acidified with 6 N HCl. The product, after recrystallization from acetone, melts at 210–211° C.

EXAMPLE V

The procedure of Example IV is repeated employing, in place of sodium hydroxide, the following bases: potassium hydroxide, barium hydroxide, lithium hydroxide, calcium hydroxide, 2-chloropyridine, 2-bromopyridine, 2-methylpyridine, 2-i-propyl and 2-n-propylpyridine, 2,4-lutidine, 2,6-lutidine, 2,4-dichloropyridine, 2-methyl-4-ethyl-pyridine, 4-chloro-2 methylpyridine and 2,4,6-collidine with comparable results.

EXAMPLE VI

*3-Benzylthiomethyl-6-Chloro-7-Sulfamyl-3,4-Dihydrobenzothiadiazine-1,1-Dioxide*

To a mixture of 2.85 g. of 2,4-disulfamyl-5-chloroaniline and 2.40 g. of benzylmercaptoacetaldehyde diethylacetal in 5 ml. of dimethylformamide is added three drops of 6 N HCl. The mixture is then heated on a steam bath for 3 hours after which it is concentrated and triturated with water. The solid is then recrystallized from acetone-ether to give the product, M. 210–211° C. Elemental analysis gives the following results:

Calculated for: $C_{15}H_{16}O_4N_3S_3Cl$: C, 41.51; H, 3.7; N, 9.7. Found: C, 41.6; H, 3.9; N, 9.6.

EXAMPLE VII

*3-Benzylsulfinylmethyl-6-Chloro-7-Sulfamyl-3,4-Dihydrobenzothiadiazine-1,1-Dioxide*

The product of Example IV, 3.5 g., is dissolved in 25 ml. of acetone and the mixture treated with 2.5 ml. of 30% aqueous hydrogen peroxide in 10 ml. of glacial acetic acid. The mixture is stirred for 7 hours and allowed to stand for 8 hours. After concentration at reduced pressure, the product obtained is washed with acetone and then water and dried. The product is then recrystallized from methanol-acetone.

EXAMPLE VIII

*3-Benzylsulfonylmethyl-6-Chloro-7-Sulfamyl-3,4-Dihydrobenzothiadiazin-1,1-Dioxide*

The product of Example IV, 3.5 g., is dissolved in 25 ml. of acetone and the mixture treated with 5.0 ml. of 30% aqueous hydrogen peroxide in 20 ml. of glacial acetic acid. The resultant mixture is heated on a steam bath for 4 hours after which the product is obtained by concentration and recrystallized from methanol-acetone.

EXAMPLE IX

The procedure of Example VI is repeated to prepare the following compounds for corresponding starting compounds:

3-p-methoxybenzylthiomethyl-6-chloro-7-sulfamyl-3,4-dihydrobenzothiadiazine-1,1-dioxide (M. 98–99° C.)
3-allylthiomethyl-6-chloro-7-sulfamyl-3,4-dihydrobenzothiadiazin-1,1-dioxide (M. 184–185° C.)
3-benzylthiomethyl-6-methyl-7-sulfamyl-3,4-dihydrobenzothiadiazine-1,1-dioxide (M. 197–198.5° C.)
3-benzylthiomethyl-6-trifluoromethyl-7-sulfamyl-3,4-dihydrobenzothiadiazine-1,1-dioxide (M. 192–193° C.)
3-p-tolythiomethyl-6-chloro-7-sulfamyl-3,4-dihydrobenzothiadiazine-1,1-dioxide (M. 138–140° C.)

EXAMPLE X

The following compounds are prepared according to the procedure of Example IV employing corresponding starting compounds:

3-dodecylthiomethyl-6-chloro-7-sulfamyl-3,4-dihydrobenzothiadiazine-1,1-dioxide
3-carboxymethylthiomethyl-6-chloro-7-sulfamyl-3,4-dihydrobenzothiadiazine-1,1-dioxide
3-ethylthiomethyl-6-chloro-7-sulfamyl-3,4-dihydrobenzothiadiazine-1,1-dioxide
3-carboxyethylthiomethyl-6-chloro-7-sulfamyl-3,4-dihydrobenzothiadiazine-1,1-dioxide
3-p-tolythiomethyl-6-chloro-7-sulfamyl-3,4-dihydrobenzothiadiazine-1,1-dioxide.

EXAMPLE XI

The compounds of Example X are oxidized to the corresponding sulfoxides by the procedure of Example VII to produce respectively:

3-dodecylsulfinylmethyl-6-chloro-7-sulfamyl-3,4-dihydrobenzothiadiazine-1,1-dioxide
3-carboxymethylsulfinylmethyl-6-chloro-7-sulfamyl-3,4-dihydrobenzothiadiazine-1,1-dioxide
3-ethylsulfinylmethyl-6-chloro-7-sulfamyl-3,4-dihydrobenzothiadiazine-1,1-dioxide
3-carboxyethylsulfinylmethyl-6-chloro-7-sulfamyl-3,4-dihydrobenzothiadiazine-1,1-dioxide
3-p-tolysulfinylmethyl-6-chloro-7-sulfamyl-3,4-dihydrobenzothiadiazine-1,1-dioxide.

EXAMPLE XII

The compounds of Example X are oxidized to the corresponding sulfones by the procedure of Example VIII to produce respectively:

3-dodecylsulfonylmethyl-6-chloro-7-sulfamyl-3,4-dihydrobenzothiadiazine-1,1-dioxide
3-carboxymethylsulfonylmethyl-6-chloro-7-sulfamyl-3,4-dihydrobenzothiadiazine-1,1-dioxide
3-ethylsulfonylmethyl-6-chloro-7-sulfamyl-3,4-dihydrobenzothiadiazine-1,1-dioxide
3-carboxyethylsulfonylmethyl-6-chloro-7-sulfamyl-3,4-dihydrobenzothiadiazine-1,1-dioxide
3-p-tolylsulfonylmethyl-6-chloro-7-sulfamyl-3,4-dihydrobenzothiadiazine-1,1-dioxide

EXAMPLE XIII

The following compounds are prepared according to the procedure of Example VI employing corresponding substituted anilines and S-substituted aldehydes or methyl, ethyl or propyl acetals:

3-p-tolylthiomethyl-6-chloro-7-sulfamyl-3,4-dihydro-benzothiadiazine-1,1-dioxide
3-ethylthiomethyl-6-chloro-7-sulfamyl-3,4-dihydrobenzo-thiadiazine-1,1-dioxide

EXAMPLE XIV

Additional 3,6 - disubstituted - 7 - sulfamyl - 3,4 - dihydrobenzothiadiazine-1,1-dioxides are prepared according to the procedures of the above examples and are listed in Table 2.

TABLE 2

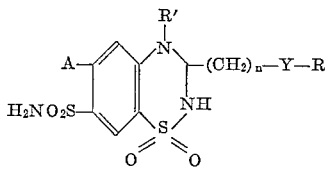

| A | Y | R′ | n | R |
|---|---|---|---|---|
| Br | S | H | 1 | $C_6H_5CH_2$ |
| Br | S | H | 1 | $4\text{-}CH_3C_6H_4$ |
| F | S | $CH_3$ | 2 | $C_{12}H_{25}$ |
| Cl | S | H | 1 | $CH_3$ |
| $CF_3$ | S | H | 2 | $C_6H_5(CH_2)_4$ |
| $CH_3$ | SO | H | 1 | $C_6H_{13}$ |
| Cl | S | $C_2H_5$ | 1 | $C_4H_9$ |
| $CH_3$ | $SO_2$ | H | 3 | $C_6H_5CH_2$ |
| i-$C_3H_7$ | $SO_2$ | $CH_3$ | 1 | $CH_3$ |
| $OC_3H_7$ | S | H | 1 | $C_6H_5(CH_2)_2$ |
| $NO_2$ | SO | $CH_3$ | 2 | $C_6H_5$ |
| $CH_3$ | S | i-$C_3H_7$ | 1 | $2\text{-}CH_3C_6H_4$ |
| $CF_3$ | $SO_2$ | H | 3 | $4\text{-}C_3H_7C_6H_4$ |
| H | S | H | 2 | $4\text{-}C_4H_9C_6H_4$ |
| H | SO | $C_2H_5$ | 2 | $C_{10}H_9$ |
| H | $SO_2$ | H | 3 | allyl |
| $CH_3$ | S | H | 2 | dodecenyl |
| Cl | S | H | 2 | hexenyl |
| $CF_3$ | $SO_2$ | H | 3 | butenyl |
| F | S | H | 2 | $2,4\text{-}(CH_3)_2C_6H_3$ |
| $C_2H_5$ | $SO_2$ | H | 2 | $3\text{-}CH_3C_6H_4CH_2$ |
| H | $SO_2$ | H | 1 | $3\text{-}NO_2C_6H_4$ |
| Cl | S | H | 1 | $3\text{-}NO_2C_6H_4CH_2$ |
| Br | S | H | 1 | $4\text{-}CH_3OC_6H_4$ |
| $CH_3$ | S | H | 1 | $4\text{-}BrC_6H_4$ |
| $OCH_3$ | S | H | 1 | $4\text{-}ClC_6H_4$ |
| F | S | H | 1 | $CH_2(CH_2)_4COOH$ |
| Cl | S | H | 1 | $CH_2CH_2COOH$ |
| $CF_3$ | SO | $CH_3$ | 1 | $CH_2(CH_2)_4COOCH_3$ |
| H | $SO_2$ | H | 2 | $CH_2CH_2COOH$ |
| Cl | $SO_2$ | H | 1 | $CH_2COOC_2H_5$ |
| Cl | SO | H | 1 | $CH_2COOC_3H_7$ |
| Br | S | H | 2 | $4\text{-}C_3H_7OC_6H_4$ |
| F | SO | $C_2H_5$ | 2 | $4\text{-}FC_6H_4(CH_2)_4$ |
| Cl | S | H | 1 | $4\text{-}NH_2C_6H_4$ |
| $OCH_3$ | S | H | 2 | $4\text{-}(CH_3)_2NC_6H_4$ |
| $CH_3$ | S | H | 1 | $4\text{-}NH_2C_6H_4CH_2$ |
| $C_3H_7$ | S | H | 1 | $4\text{-}C_3H_7NHC_6H_4$ |
| $CF_3$ | S | H | 2 | $4\text{-}(C_2H_5)_2NC_6H_4CH_2$ |
| $NO_2$ | $SO_2$ | H | 2 | $4\text{-}CH_3NHC_6H_4(CH_2)_4$ |
| Cl | S | H | 1 | allyl |
| Br | $SO_2$ | H | 1 | cyclohexyl |
| F | S | H | 1 | cyclopentyl |
| $CH_3$ | S | H | 1 | cyclobutyl |
| $C_3H_7$ | SO | H | 1 | thienyl |
| $OCH_3$ | S | H | 1 | thiazolyl |
| $OC_3H_7$ | S | H | 1 | pyrimidyl |
| Br | S | H | 1 | pyridyl |
| Cl | S | H | 3 | pyrimidyl |
| Cl | SO | H | 2 | furfuryl |
| $CH_3$ | S | H | 1 | picolyl |
| $C_3H_7$ | S | H | 1 | thienylethyl |
| Cl | S | H | 1 | pyridylpropyl |
| Cl | S | H | 1 | furylpropyl |
| Cl | S | H | 1 | thienyl |
| F | S | H | 1 | methylfurfuryl |
| Cl | S | H | 1 | imidazolyl |
| Cl | S | H | 2 | benzimidazolyl |
| $CH_3$ | S | $CH_3$ | 1 | furyl |
| F | S | $C_3H_7$ | 1 | $COOCH_3$ |
| Br | SO | $C_2H_5$ | 3 | $COOCH_2C_6H_5$ |
| $NH_2$ | $SO_2$ | H | 2 | $CH_2(CH_2)_4COOC_6H_5$ |
| Cl | S | H | 1 | $C(NH_2)=NH$ |
| $CH_3$ | S | H | 1 | $C(NH_2)=NH$ |
| $NH_2$ | $SO_2$ | H | 2 | $C(NaCH_3)=NH$ |
| $CH_3$ | S | H | 1 | $C(NHC_6H_5)=NH$ |
| Cl | S | H | 1 | $C(NHC_3H_7)=NH$ |
| Cl | SO | H | 1 | $C(NHC_6H_5)=NC_6H_5$ |
| Cl | $SO_2$ | H | 1 | $C(NH(CH_2)_4C_6H_5)=NH$ |
| Cl | S | H | 1 | $CN_2C(NH_2)=NH$ |
| $CH_3$ | $SO_2$ | H | 1 | $CH_2(CH_2)_4C(NHCH_3)=NH$ |
| Cl | S | H | 1 | $C(NHCH_2C_6H_5)=NH$ |

The following compounds are prepared by reaction of the corrresponding lower alkyl ester with concentrated ammonia, a hydrazine or an amine according to the method of Example XV.

| A | Y | R′ | n | R |
|---|---|---|---|---|
| $CH_3$ | S | H | 2 | $CONH_2$ |
| $NO_2$ | S | H | 2 | $CONHCH_3$ |
| Cl | SO | H | 1 | $CONHNH_2$ |
| Cl | $SO_2$ | $CH_3$ | 2 | $CONHCH_2C_6H_5$ |
| Cl | S | H | 3 | $CONHNHC_3H_7$ |
| Cl | S | H | 1 | $CONHNH(CH_2)_4C_6H_5$ |
| Cl | SO | H | 1 | $CONHC_6H_5$ |
| Cl | SO | H | 1 | $CH_2(CH_2)_4CONH_2$ |
| Cl | S | H | 2 | $CH_2(CH_2)_4CONH_2$ |
| $NO_2$ | S | H | 1 | $CH_2(CH_2)_4CONHCH_3$ |
| $CH_3CO$ | $SO_2$ | H | 1 | $CH_2CH_2CONHNHC_6H_5$ |

EXAMPLE XV

*3-Benzylcarbamylmethylthiomethyl-6-Chloro-7-Sulfamyl-3,4-Dihydrobenzothiadiazine-1,1-Dioxide*

A mixture of 3-carbethoxymethylthiomethyl-6-chloro-7-sulfamyl-3,4-dihydrobenzothiadiazine-1,1-dioxide (0.03 mole) in 5 ml. of benzylamine is heated with stirring for 2 hours at 120° C. The cooled solid mass is treated with water which is acidified with 6 N HCl to obtain the product which is recrystallized from acetone-water.

EXAMPLE XVI

*3-Carbamylmethylthiomethyl-6-Chloro-7-Sulfamyl-3,4-Dihydrobenzothiadiazine-1,1-Dioxide*

To 3-carboxymethylthiomethyl-6-chloro-7-sulfamyl - 3, 4-dihydrobenzothiadiazine-1,1-dioxide (0.02 mole) in 20 ml. of dimethylformamide is added excess phosphorus oxychloride and the mixture stirred until homogeneous. The mixture is heated at 60° C. for one hour after which it is concentrated under reduced pressure. The residue is cooled in an ice bath and treated with concentrated ammonium hydroxide. The excess ammonia is stripped at reduced pressure and the solution acidified with 6 N HCl to obtain the product which is filtered, washed with water, dried and recrystallized from acetone-water.

In similar manner additional amides and hydrazides of Table 2 are prepared employing $R_1NH_2$, $R_1NHNH_2$ or $NHNH_2$, in lieu of ammonia, with corresponding starting compounds.

EXAMPLE XVII

The hydrochloride of 3-p-aminophenylthiomethyl - 6-chloro-7-sulfamyl-3,4-dihydrobenzothiadiazine-1,1-dioxide is prepared by dissolving this compound in an aqueous solution containing an equivalent molar amount of hydrochloric acid. The solution is then concentrated under reduced pressure to obtain the corresponding hydrochloride. This procedure is employed in the preparation of other acid salts with hydrobromic acid, hydroiodic acid and sulfuric acid.

This procedure is repeated employing a solution of hydrogen chloride in ethanol with comparable results.

EXAMPLE XVIII

The potassium salt of 3-benzylthiomethyl-6-chloro-7-sulfamyl-3,4-dihydrobenzothiadiazine-1,1 - dioxide is prepared by dissolving this compound in an aqueous solution containing an equivalent molar amount of potassium carbonate. The resultant solution is concentrated under reduced pressure to obtain the potassium salt.

This procedure is repeated employing aqueous sodium bicarbonate, barium hydroxide and alcoholic sodium hydroxide to obtain the corresponding metal salt.

EXAMPLE XIX

The hydrochloride of 3-p-aminophenylthiomethyl - 6-chloro-7-sulfamyl-3,4-dihydrobenzothiadiazine-1,1 - dioxide is dissolved in water to which is then added an equivalent molar amount of silver acetate. The silver chloride precipitate which forms is filtered and the filtrate concentrated under reduced pressure to obtain the acetic acid addition salt.

In a similar manner, the tartaric, citric, gluconic and propionic acid addition salts are prepared.

EXAMPLE XX

A tablet base is prepared by blending the following ingredients in the proportion by weight indicated:

Sucrose U.S.P. ------------------------------- 82.0
Tapioca starch ------------------------------- 13.6
Magnesium stearate -------------------------- 4.4

Into this base there is blended a sufficient amount of 3-benzylthiomethyl-6-chloro - 7 - sulfamyl - 3,4 - dihydrobenzothiadiazine-1,1-dioxide to provide tablets containing 250 mg. of active ingredient.

EXAMPLE XXI

Into the tablet base of Example XX there is blended a sufficient amount of 3-benzylsulfonylmethyl-6-chloro-7-sulfamyl-3,4-dihydrobenzothiadiazine-1,1-dioxide to provide tablets containing 0.5 g. of active ingredient.

This application is a continuation-in-part of copending application, Serial Number 785,138, filed January 6, 1959, and now abandoned, which is a continuation-in-part of copending application Serial Number 780,675, filed December 16, 1958, and now abandoned, which is a continuation-in-part of copending application Serial Number 715,482, filed February 17, 1958.

What is claimed is:

1. A compound useful as a diuretic agent selected from the group consisting of compounds represented by the formula:

[Chemical structure]

wherein A is selected from the group consisting of hydrogen, Cl, F, Br, $NO_2$, $NH_2$, trifluoromethyl and alkyl and alkoxy each having 1 to 3 carbon atoms; R' is selected from the group consisting of hydrogen and alkyl having 1 to 3 carbon atoms; R is selected from the group consisting of alkyl and alkenyl having up to 12 carbon atoms; cycloalkyl having 4 to 6 carbon atoms; naphthyl;

[Chemical structure]

wherein $k$ is an integer from 0 to 4 and $R_3$ is selected from the group consisting of hydrogen, amino, lower alkylamino, nitro, fluoro, chloro, bromo, lower alkyl and lower alkoxy; $Z-(CH_2)_q-$ wherein $q$ is an integer from 0 to 3 and Z is selected from the group consisting of thienyl, thiazolyl, pyrimidyl, pyridyl, furyl, imidazolyl and benzimidazolyl; and $$-(CH_2)_r-\overset{NR_2}{\underset{}{C}}-NHR_2$$

wherein $r$ is an integer from 0 to 5 and $R_2$ is selected from the group consisting of hydrogen, lower alkyl, phenyl and aralkyl having 7 to 10 carbon atoms; Y is selected from the group consisting of S, SO and $SO_2$; and $n$ is an integer from 1 to 3; and the acid and base addition salts thereof.

2. A compound useful as a hypotensive agent selected from the group consisting of compounds represented by the formula:

[Chemical structure]

wherein A is selected from the group consisting of hydrogen, Cl, F, Br, $NO_2$, $NH_2$, trifluoromethyl and alkyl and alkoxy each having 1 to 3 carbon atoms; R' is selected from the group consisting of hydrogen and alkyl having 1 to 3 carbon atoms; R is selected from the group consisting of $$-(CH_2)_p-\overset{O}{\underset{}{C}}-X$$

wherein $p$ is an integer from 0 to 5 and X is selected from the group consisting of $-NH_2$, $-NHR_1$, $-NHNH_2$ and $-NHNHR_1$, wherein $R_1$ is selected from the group consisting of lower alkyl, phenyl and aralkyl having 7 to 10 carbon atoms;

Y is selected from the group consisting of S, SO and $SO_2$; and $n$ is an integer from 1 to 3;

and acid and base addition salts thereof.

3. A compound of the formula:

[Chemical structure]

wherein A is selected from the group consisting of hydrogen, Cl, F, Br, $NO_2$, $NH_2$, trifluoromethyl and alkyl and alkoxy each having 1 to 3 carbon atoms; R' is selected from the group consisting of hydrogen and alkyl having 1 to 3 carbon atoms; R is selected from the group consisting of $$(CH_2)_m\overset{O}{\underset{}{C}}OH$$

wherein $m$ is an integer from 1 to 5; and $(CH_2)_pCOOR_1$, wherein $p$ is an integer from 0 to 5 and $R_1$ is selected from the group consisting of lower alkyl, phenyl and aralkyl having 7 to 10 carbon atoms; Y is selected from the group consisting of S, SO and $SO_2$; and $n$ is an integer from 1 to 3.

4. A compound as in claim 1 wherein A is chloro, Y is S, R' is hydrogen, and R is phenylalkyl in which the alkyl moiety has up to 4 carbon atoms.

5. A compound as in claim 1 wherein A is methyl, Y is S, R' is hydrogen and R is phenylalkyl in which the alkyl moiety has up to 4 carbon atoms.

6. A compound as in claim 1 wherein A is trifluoromethyl, Y is S, R' is hydrogen, and R is phenylalkyl in which the alkyl moiety has up to 4 carbon atoms.

7. A compound as in claim 1 wherein A is chloro, Y is S, R' is hydrogen, and R is monosubstituted phenylalkyl having a lower alkoxy group on the phenyl moiety and up to 4 carbon atoms in the alkyl moiety.

8. A compound as in claim 1 wherein A is chloro, Y is S, R' is hydrogen, and R is furylalkyl in which the alkyl group has up to 3 carbon atoms.

9. A compound as in claim 1 wherein A is chloro, Y is S, R' is hydrogen, and R is alkenyl containing up to 5 carbon atoms.

10. A compound as in claim 1 wherein A is chloro, Y is S, R' is hydrogen, and R is thienyl.

11. A compound as in claim 1 wherein A is chloro, Y is S, R' is hydrogen and R is alkyl having up to 5 carbon atoms.

12. 3-benzylthiomethyl-6 - chloro-7 - sulfamyl - 3,4-dihydro-1,2,4-benzothiadiazine-1,1-dioxide.

13. 3-benzylthiomethyl - 6 - methyl-7 - sulfamyl-3,4-dihydro-1,2,4-benzothiadiazine-1,1-dioxide.

14. 3 - allylthiomethyl - 6 - chloro-7 - sulfamyl - 3,4-dihydro-1,2,4-benzothiadiazine-1,1-dioxide.

No references cited.